United States Patent [19]
Dixon et al.

[11] 3,724,232
[45] Apr. 3, 1973

[54] AUTOMOBILE AIR CONDITIONING SYSTEM

[76] Inventors: Don P. Dixon; John T. Bertva, both of P.O. Box 8648, San Antonio, Tex. 78208

[22] Filed: July 6, 1971

[21] Appl. No.: 159,881

[52] U.S. Cl. ..................62/244, 62/239, 62/243
[51] Int. Cl. .....................................B60h 3/04
[58] Field of Search.........................62/239, 243, 244

[56] References Cited

UNITED STATES PATENTS 3,411,316  11/1968  Wright....................................62/239
3,494,540  2/1970  Dixon...................................62/243 X

*Primary Examiner*—William J. Wye
*Attorney*—W. F. Hyer et al.

[57]    ABSTRACT

An air conditioning system for an automobile having a spare tire compartment in its front portion and above a generally horizontal wall of the automobile frame. Front and rear openings are formed in the wall and a coil is arranged within a housing mounted on the wall above the openings to cause air flow from the front to rear openings to pass through it.

16 Claims, 5 Drawing Figures

PATENTED APR 3 1973 3,724,232

Don P. Dixon
John T. Bertva
INVENTORS

BY Hyer, Eickenrolt,
Thompson & Turner
ATTORNEYS

Don P. Dixon
John T. Bertva
INVENTORS

BY Hyer, Eickenroht,
Thompson & Turner
ATTORNEYS

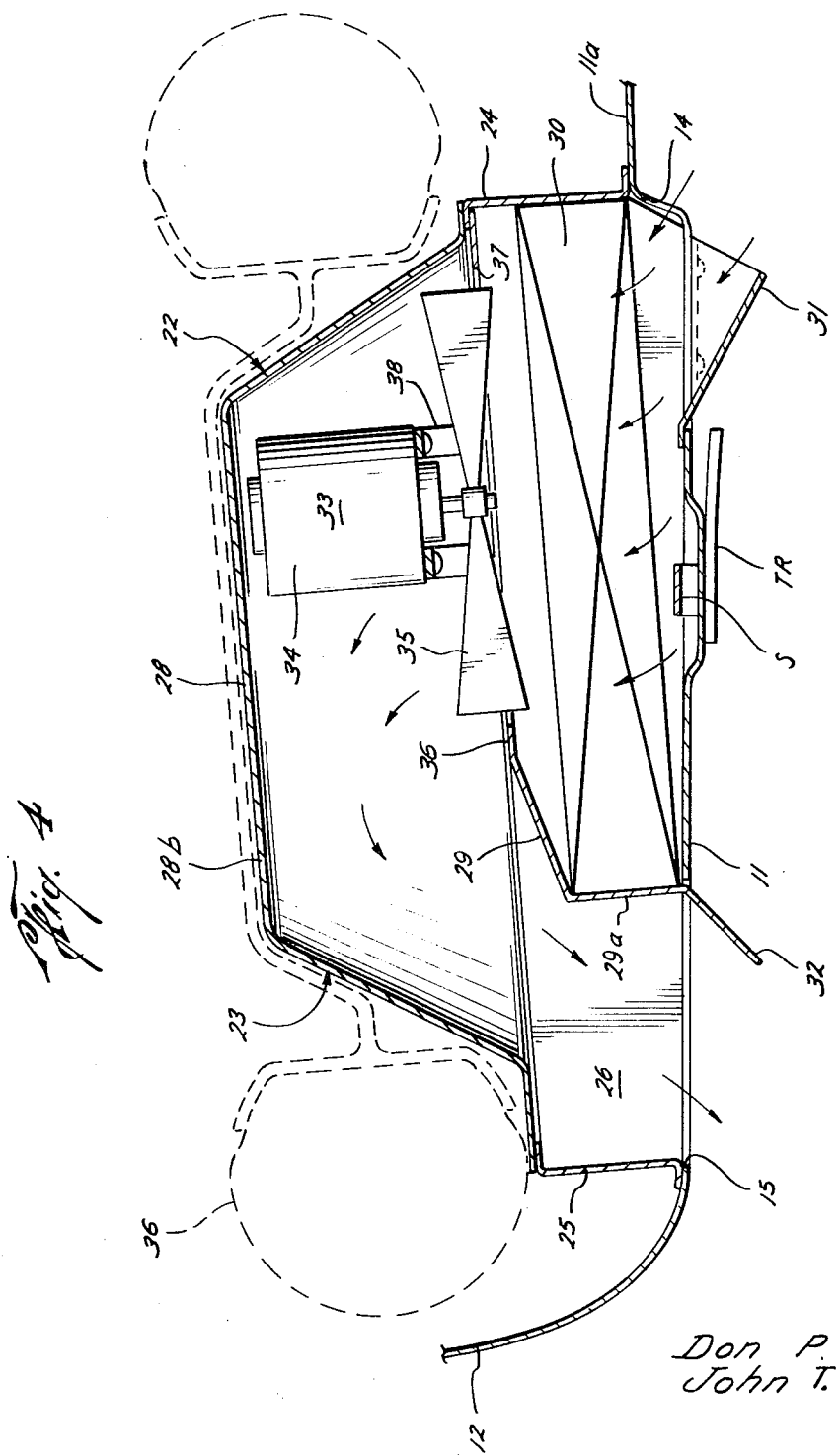

AUTOMOBILE AIR CONDITIONING SYSTEM

This invention relates to an air conditioning system for an automobile; and, more particularly, an improved condenser assembly of such a system which is especially adapted for a compact, motor-in-the-rear type automobile, such as the 1971 model Porsche "914."

Conventional air conditioning systems are not suited for compact automobiles of this type where space is at a premium. Thus, there is a problem in finding room for the components of the system, including the condenser, at least without major modifications of the construction of the automobile. In other vehicles of this type, such as those shown and described in U.S. Pat. Nos. 3,381,492 and 3,384,297, it has therefore been proposed to mount the condenser in a generally upright position within a space between the front axle and the spare tire compartment.

In the 1971 model Porsche "914," the spare tire is stored in a generally horizontal position so as to provide a structural support against compressive loads in the case of front-end collisions. In the compartment provided for this purpose, there is also substantial room for storing luggage above and on opposite sides of the spare tire. However, the bottom wall of the automobile frame which provides the floor for the compartment extends between the front end of the automobile and the fire wall which separates it from the passenger compartment, and thus over the front axle, so that there is no upright space for a condenser.

It is therefore an object of this invention to provide an air conditioning system for an automobile in which the condenser is mounted in a forward portion thereof, but substantially entirely above the bottom wall of the frame so that it is not subject to damage.

Another object is to provide such a system in which the condenser is mounted almost entirely within the spare tire compartment, and yet consumes only a minimum of space therein and requires only minimum modifications thereto, and preferably in such a manner as to permit storage of the spare tire in generally the same horizontal position it would normally occupy.

Still another object is to provide a condenser assembly for such a system which is of simple and compact construction and which is easy to install and repair.

These and other objects are accomplished, in accordance with the illustrated embodiment of the present invention, by a condenser assembly comprising a housing mounted on the bottom wall of the frame providing the floor of the spare tire compartment so as to confine a space thereabove and a coil so arranged within the housing so as to cause air passing into a front opening formed in the wall to pass through the coil and out a rear opening formed therein. Thus, the only major modifications which must be made to the automobile are the formation of the front and rear openings, and these merely require temporary removal of the spare tire.

The relatively flat coil preferably extends substantially horizontally across the front opening, whereby the condenser assembly consumes a minimum of head room within the spare tire compartment. Also, the housing preferably has a frusto-conically shaped dome to receive a fan on its inner side for drawing air through the coil, and to permit the spare tire to be disposed over its outer side and thus in a position at least close to the position it occupied prior to installation of the condenser assembly. This not only retains the structural advantage of the spare tire, but also further contributes to the saving of space within the compartment.

In the drawings, wherein like reference characters are used throughout to designate like parts:

FIG. 4 is a cross-sectional view of the installed condenser assembly, as seen along broken lines 4—4 of FIG. 3.

Figure 1:
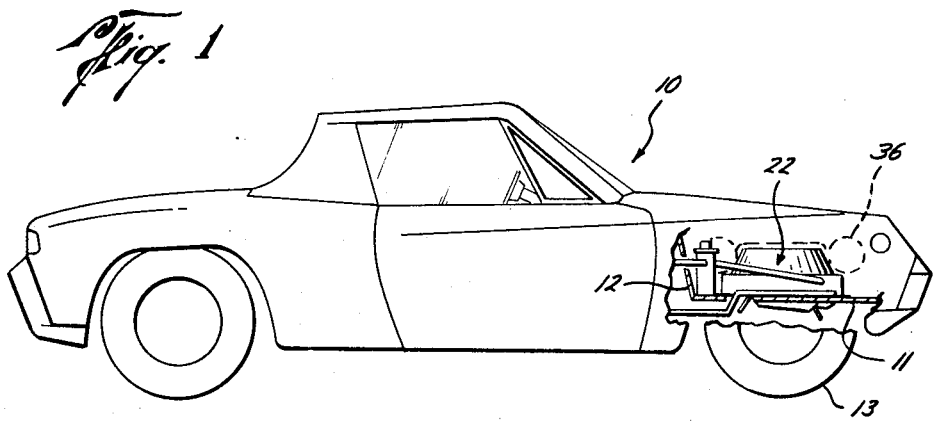
FIG. 1 is a side view of a 1971 model Porsche "914" automobile, having a portion broken away to show a condenser assembly installed in accordance with the present invention.

With reference now to the details of the above-described drawings, and particularly FIG. 1, the 1971 model Porsche "914" automobile shown therein, and designated in its entirety by reference character 10, has its motor (not shown) mounted in a rear compartment intermediate the rear end and passenger compartment of the automobile. As previously described, this automobile also has a front compartment for storing a spare tire intermediate its front end and the passenger compartment. Thus, as shown by the cutaway portion of FIG. 1, this compartment extends vertically between the hood of the automobile and the bottom wall 11 of its frame, and horizontally forwardly from a firewall 12 at the front end of the passenger compartment. As will therefore be apparent from FIG. 1, the spare tire compartment is disposed over the axle for the front wheels 13 of the automobile, and with its floor relatively close to the ground surface.

The air conditioning system to be installed in the automobile 10 will, of course, include, in addition to the condenser assembly to be described hereinafter, a compressor and an evaporator. Although neither of the latter are shown in the drawings, it will be understood that the compressor will normally be mounted within the rear motor compartment and driven from a power takeoff on the drive shaft, and that the evaporator will normally be installed within the automobile beneath the dashboard of the passenger compartment and with its outlet facing rearwardly so as to deliver cool air thereto. These compartments will, of course, be connected by suitable conduits to the condenser assembly to be described, thereby providing a complete air conditioning system adapted to function in the usual manner.

Figure 2:
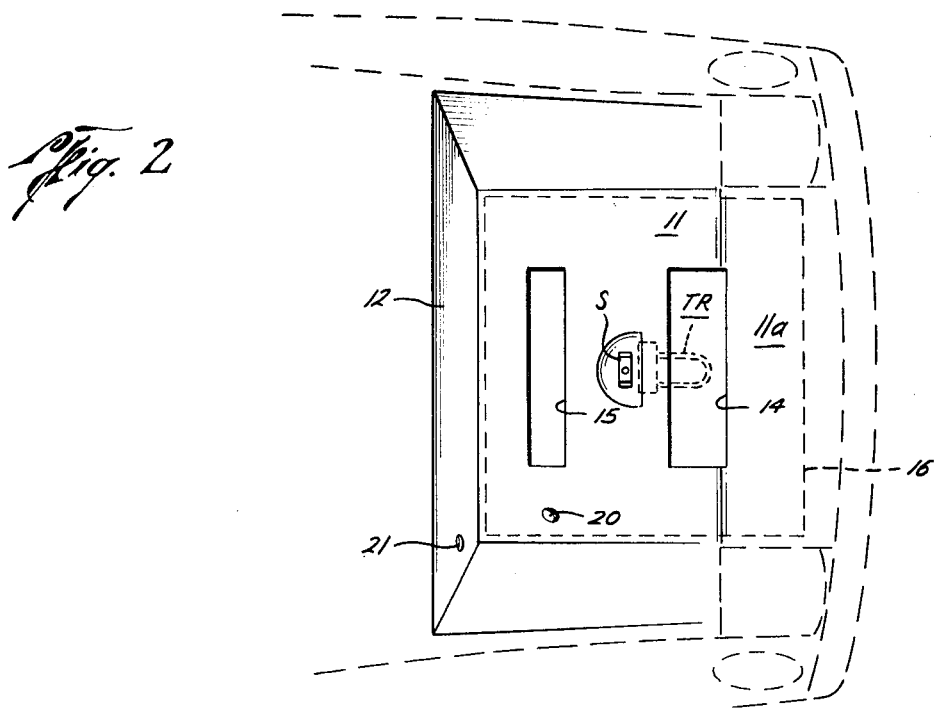
FIG. 2 is a top plan view of the spare tire compartment of the automobile shown in FIG. 1, upon formation of the front and rear openings in the floor thereof, but prior to mounting of the condenser assembly.

As previously described, the spare tire compartment is prepared by the formation of front and rear openings 14 and 15 in the bottom frame wall 10. As indicated in FIG. 2, these openings are cut with the assistance of a template 16 shown in broken lines as being laid over the bottom wall. The template is also useful in forming a hole 20 in the wall 11 to the right side (facing forwardly) of rear opening 15. Another hole 21 is formed in the firewall 12 generally rearwardly of the hole 20. As described to follow, these holes are adapted to receive conduits for circulating refrigerant gas to and from the condenser assembly.

As can be seen from FIG. 2, the openings 14 and 15 are rectangular and disposed longitudinally behind one another and on opposite sides of a strap S secured to the wall 11 and providing a hole to receive a bolt (not shown) for holding the spare tire against the wall. As also shown in FIG. 2, these openings are formed laterally intermediate the opposite sides of the bottom wall 11, and thus short of the upwardly sloping side walls 12a of the spare tire compartment. When so formed, the rear edge of the front opening 14 is above the forwardly extending portion of a tow ring TR indicated in broken lines in FIG. 2. For purposes to be described, this portion of the tow ring TR is sawed off in line with the rear edge of opening 14, leaving only the rear portion thereof shown in solid lines in FIG. 4.

As best shown in FIG. 4, the bottom wall 11 includes a step up 11a at its front end, and the opening 14 cuts through the step up so as to face generally upwardly and forwardly from its rear edge to its front edge. As will be described to follow, this configuration of the front opening is useful in the installation of the condenser assembly in that it provides a convenient means by which air passing beneath the wall 11 may be scooped into and then diverted from the housing of the condenser assembly.

Figure 5:
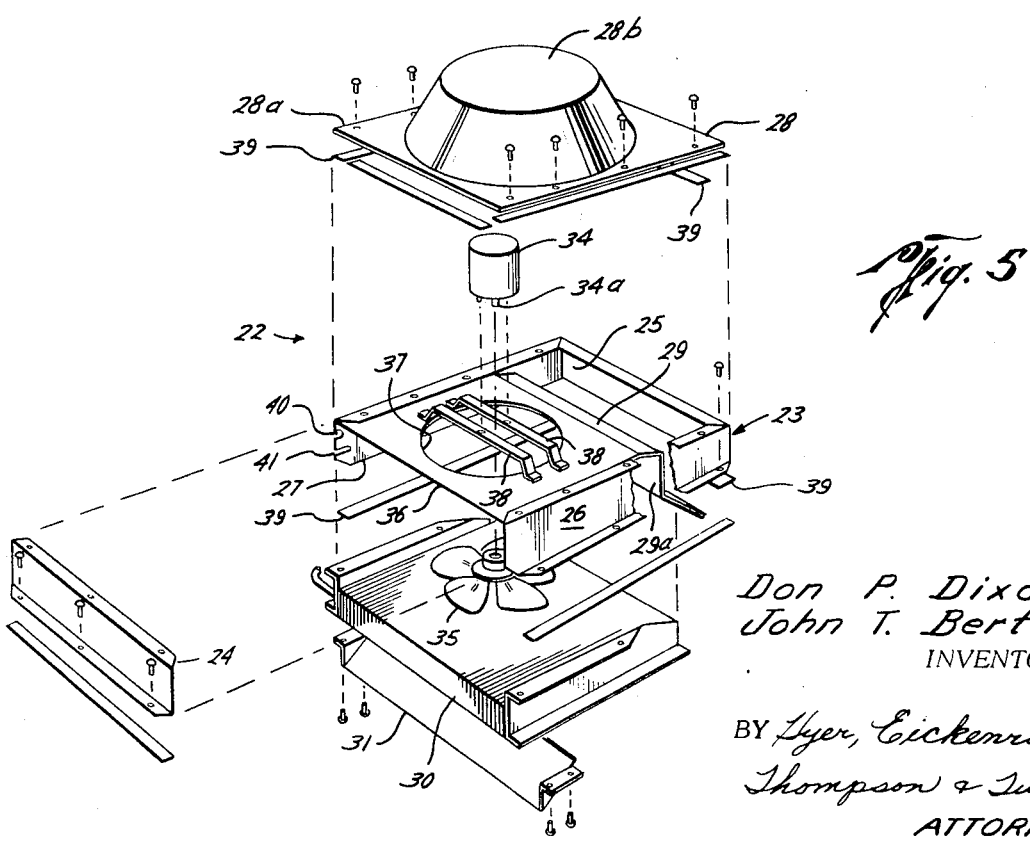
FIG. 5 is an exploded perspective view of the condenser assembly removed from installation within the spare tire compartment.

The condenser assembly itself, which is designated in its entirety by reference character 22, comprises a housing 23 having upstanding front and rear walls 24 and 25, respectively, left and right (facing forwardly) side walls 26 and 27, respectively, and a top wall 28 which extends between the upper edges of the front, rear and side walls so as to enclose a space within the housing when it is mounted on the bottom wall 11 of the automobile frame, as best shown in FIG. 4. The housing 22 also includes a partition 29 which extends laterally between the side walls 26 and 27, and, as shown in FIGS. 4 and 5, has a vertical wall 29a which is parallel to the front and rear walls and generally above the front edge of the rear opening 15 in the wall 11, and thus nearer the rear wall than the front wall.

A generally flat coil 30 extends horizontally within the housing 22 between the front wall 24 and the vertical wall 29a as well as between the side walls 26 and 27. Thus, as indicated by the arrows in FIG. 4, air which flows into the front opening 14 is confined for passage through the coil 30 prior to passing outwardly through the rear opening 15.

In order to facilitate this air passage, the housing also includes an air scoop 31 which includes a downwardly and forwardly disposed plate extending laterally between the side walls 26 and 27. As best shown in FIG. 4, the upper rear edge of the plate of the air scoop is disposed generally above the rear edge of front opening 14, and the lower front edge of the plate is disposed beneath such opening. Consequently, the air scoop intercepts air which would otherwise pass beneath the wall 11 and directs it upwardly and rearwardly for passage through the coil 30.

The partition 29 also includes a plate 32 which projects downwardly and rearwardly from the lower edge of vertical wall 29a and extends laterally between the side walls 26 and 27. The plate thus diverts air which passes between the vertical wall 29a and inner wall 25 in a rearward direction, as indicated by the arrows in FIG. 4.

The top wall 28 of the housing 22 includes a flat, substantially horizontal portion 28a which is connected about its four edges to the front, rear and side walls, and a dome 28b raised above the portion 28a. As best shown in FIG. 4, the dome 28 receives a fan 33 positioned above the coil 30 for drawing air upwardly therethrough. More particularly, a motor 34 for rotating the blade 35 of the fan is supported within the dome 28b so as to dispose the fan 35 for rotation about a substantially vertical axis.

As shown in FIGS. 1 and 4, the dome 28b is frustoconically shaped and of such size as to permit the rim of a spare tire 36 (shown in broken lines) to be disposed thereover and thus supported in a generally horizontal position only somewhat higher than that in which it was supported prior to installation of the condenser assembly. Thus, as previously mentioned, the condenser assembly permits the spare tire to be disposed in a position which retains its structural advantage and also consumes only a minimum amount of space which was otherwise available prior to installation of the condenser assembly. Thus, as will be appreciated from FIGS. 3 and 4, the only effective space which the condenser assembly occupies is that defined between the front, rear and side walls of the housing. That is, the assembly has consumed none of the space previously available on opposite sides or at the front and rear of the spare tire, and only a small amount of head room in the spare tire compartment.

Figure 3:
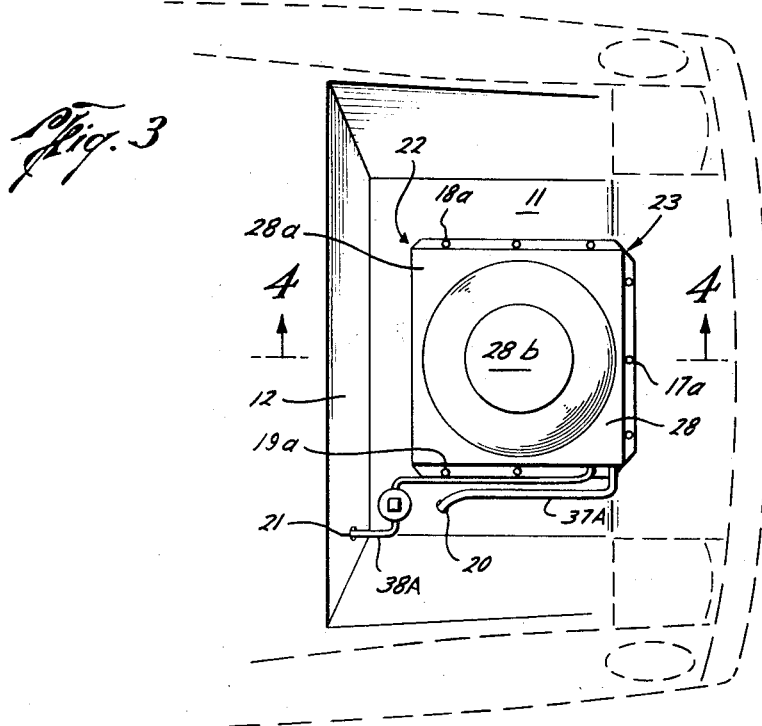
FIG. 3 is a top plan view of the spare tire compartment, similar to FIG. 2, but upon installation of the condenser assembly.

As shown in FIGS. 1 and 3, conduits 37A and 38A connecting the coil 30 within the condenser assembly with the remainder of the system extend through holes 20 and 21, respectively. As well known in the art, these conduits are connected with terminal parts of the coil so as to circulate refrigerant gas through the tubes of the coil on which the fins are vertically arranged, as indicated in FIG. 5.

FIG. 5 illustrates the separate parts of the condenser assembly prior to their mounting on the wall 11. Thus, as shown in FIG. 5, the rear wall 25 and side walls 26 and 27 are joined at their outer and rear edges, and the partition 29 includes a thin plate 36 which extends forwardly of vertical wall 29a between the upper edges of the side walls. For this purpose, the side walls have inwardly extending flanges at their upper ends which are secured to the plate by suitable fasteners. As will be apparent from FIG. 5, the plate extends from a position adjacent the front edges of the side walls to a position adjacent the upper edge of the vertical wall 29a, so that it covers the top of the coil 30.

A circular hole 37 in the plate provides an opening through which air passing over the coil may then pass into the dome 28b of the housing. As will be described, the hole 37 receives the fan blade 35 of the fan 33 and is of a diameter for fitting relatively closely thereabout so that the fan is effective for drawing substantially all of the air which passes through the hole 37.

Each of the rear wall 25 and front wall 24 is also provided with an inwardly extending flange along its upper edge. Thus, when the flange at the upper edge of wall 24 slides over the forward edge of plate 36, as the front wall is moved into position adjacent the side walls 26 and 27, it forms a continuous rim to which top wall 28 may be connected, as will be described to follow.

The front and rear walls as well as the rear edges of the side walls 26 and 27 are of substantially the same height, as will be apparent from FIG. 5. However, the front edges of the side walls are higher than the other walls and have lower edges which taper forwardly and downwardly from their rear edges to their front edges. Thus, the side walls have triangularly shaped portions which depend from the bottom edges of the side and rear walls and the bottom of the coil, as shown in FIG. 4.

There are outwardly extending flanges along the lower edges of the side walls as well as the lower edge of the front wall 24, which receive screws 17a, 18a and 19a (see FIG. 3) for securing them to the bottom wall 11. More particularly, and as shown in FIG. 4, the inner edge of the lower flange on front wall 24 rests on the step up 11a and is generally adjacent the front edge of the opening 14, and the lower edge of the lower flange of the rear wall 25 is generally adjacent the rear edge of the opening 15. Although not shown, it will be understood that the inner edges of the lower flanges on the side walls are likewise disposed generally adjacent the side edges of the openings 14 and 15. Thus, the housing is mounted on the wall 11 so as to take maximum advantage of the openings 14 and 15, without consuming undue space within the spare tire compartment.

With the housing mounted in this manner, triangularly shaped lower portions of side walls 26 and 27 extend along the flat bottom 11 and thus beneath the the coil at its opposite sides. As will be apparent from FIG. 4, this provides further confinement of air beneath the wall 11 for passage through the housing, without consuming otherwise useable space beneath the wall.

The coil 30 has channels along its opposite sides which fits closely within the side walls 26 and 27 of the housing 23. More particularly, the upper flanges of the channels have holes which permit them to be secured to the housing by means of the fasteners which connect the flanges of the side walls to the plate 36. The lower flanges on the channels prevent bypass of air, and the air scoop 31 has flanges on its opposite sides which are secured to the bottom wall to dispose the lower front edge of the plate of the scoop near the front wall 24 of the housing, as shown in FIG. 4.

The previously described rim provided by the inwardly extending flanges about the front, rear and side walls of the housing 23 provide a means on which the top wall 28 of the housing may be supported. As indicated in FIG. 5, fasteners connect the flanges on the side walls to the sides of the flat portion 28a of the top wall, when it is so supported.

Arms 38 are connected to the plate 36 and extend laterally across the hole 37 therethrough for supporting the motor 34 within the dome 28b. More particularly, the arms are raised above the top side of the plate 36 so that the blade 35 suspended from the drive shaft 34a of the motor 34 is supported generally within the hole 37. Thus, as will be apparent from FIG. 5, pins on the lower end of the motor 34 pass through holes in the arms 38 to permit the motor to be secured to the arms with its drive shaft 34a extending between them centrally of the hole 37, whereupon the blade 35 may then be connected to the depending portion of the drive shaft 34a.

FIG. 5 also shows a series of strips or tapes 39 of suitable material for providing a tight seal between the top wall and the front, rear and side walls of the housing, and between the latter walls and the bottom wall 11. As also shown in FIG. 5, the front edge of side wall 27 is provided with notches 40 and 41 to permit the conduits 37A and 38A to pass from the side of the coil through the housing and thus into the position shown in FIG. 3.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In an automobile having a spare tire compartment intermediate the passenger compartment and the front end of the automobile and above a generally horizontal wall of the bottom frame of the automobile, and wherein a pair of front and rear openings are formed in the wall, an air conditioning system including a condenser assembly comprising a housing mounted on the wall to confine a space within the compartment above said openings, and a coil arranged within the housing to cause air flow from the front to the rear openings to pass through it.

2. An air conditioning system of the character defined in claim 1, wherein said housing has a frusto-conically shaped dome over which a spare tire may be disposed.

3. An air conditioning system of the character defined in claim 1, wherein said condenser assembly also comprises a fan mounted within the housing for drawing air through the coil.

4. An air conditioning system of the character defined in claim 3, wherein said housing has a frusto-conically shaped dome in which the fan is disposed and over which a spare tire may be placed.

5. An air conditioning system of the character defined in claim 1, wherein said coil is generally flat and extends substantially horizontally across said front opening.

6. An air conditioning system of the character defined in claim 5, wherein said condenser assembly comprises a fan mounted within the housing above the coil for drawing air upwardly therethrough.

7. An air conditioning system of the character defined in claim 6, wherein said housing has a frusto-conically shaped dome in which the fan is disposed and over which a spare tire may be placed.

8. In an automobile having a spare tire compartment intermediate the passenger compartment and the front end of the automobile and above a generally horizontal wall of the bottom frame of the automobile, and wherein a pair of front and rear openings are formed in the wall, an air conditioning system including a condenser assembly comprising a housing mounted on the frame wall and including front and rear walls forwardly and rearwardly of the front and rear openings, respectively, said walls on opposite sides of the opening, a top wall extending between the front, rear and side walls to confine a space within the compartment above said frame wall, and a vertical intermediate wall extending laterally between the side walls at the front edge of the rear opening, and a coil supported by the housing and extending generally horizontally between its side walls and from its front wall to its intermediate wall, whereby air flow from the front to the rear opening is confined to passage through said coil.

9. An air conditioning system of the character defined in claim 8, wherein the front portions of the side walls of the housing extend downwardly and forwardly below the bottom of the coil and the front wall of the housing.

10. An air conditioning system of the character defined in claim 9, including an air scoop having a plate extending laterally between the side walls and downwardly and forwardly from said front opening.

11. An air conditioning system of the character defined in claim 9, including an air deflector having a plate extending laterally between the side walls and downwardly and rearwardly from the bottom edge of the intermediate plate and through said rear opening.

12. An air conditioning system of the character defined in claim 8, wherein said top wall includes a frusto-conically shaped dome over which a spare tire may be placed, and a fan is mounted on the housing within the dome and above the coil for drawing air upwardly through the coil.

13. An automobile air conditioning condenser assembly, comprising a housing having upstanding front, rear and side walls, a top wall extending over the space within the housing enclosed by the walls and including a generally frusto-conically shaped dome, a vertical intermediate wall extending laterally within said space beneath the dome and between the side walls, a coil supported by the housing and extending generally horizontally between the side walls and from the front to the intermediate wall thereof, said top wall including a generally frusto-conically shaped dome, a motor supported within the dome, and a blade rotatable on a vertical drive shaft of the motor above the coil.

14. A condenser assembly of the character defined in claim 13, wherein the housing includes a plate extending horizontally between the side walls thereof and above the top of the coil, said plate having a hole therein to receive the fan blade, and there are arms on the plate and over the hole which support the motor.

15. A condenser assembly of the character defined in claim 13, including an air scoop having a plate extending laterally between and downwardly and forwardly from a mid portion of the side walls.

16. A condenser assembly of the character defined in claim 13, including an air deflector having a plate extending laterally between the side walls and downwardly and rearwardly from the bottom edge of the horizontal plate.

* * * * *